United States Patent
Cuddihy et al.

(10) Patent No.: US 9,475,405 B2
(45) Date of Patent: Oct. 25, 2016

(54) VEHICLE OCCUPANT CLASSIFICATION

(71) Applicant: Ford Global Technologies, LLC, Dearborn, MI (US)

(72) Inventors: Mark A. Cuddihy, New Boston, MI (US); Manoharprasad K. Rao, Novi, MI (US); Agnes S. Kim, Dearborn, MI (US); Robert William McCoy, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/547,445

(22) Filed: Nov. 19, 2014

(65) Prior Publication Data
US 2016/0137102 A1    May 19, 2016

(51) Int. Cl.
*B60N 2/00* (2006.01)
*B60R 21/015* (2006.01)

(52) U.S. Cl.
CPC ......... *B60N 2/002* (2013.01); *B60R 21/01556* (2014.10)

(58) Field of Classification Search
CPC .................. B60R 21/01556; B60N 2/002
See application file for complete search history.

(56) References Cited

U.S. PATENT DOCUMENTS

| | | | |
|---|---|---|---|
| 6,260,879 B1 * | 7/2001 | Stanley | G01G 19/4142 180/268 |
| 6,382,667 B1 * | 5/2002 | Aoki | B60R 21/01546 280/735 |
| 6,609,054 B2 | 8/2003 | Wallace | |
| 7,163,075 B2 | 1/2007 | Gray | |
| 7,830,246 B2 | 11/2010 | Hawkins | |
| 2002/0134590 A1 * | 9/2002 | Wolfe | B60R 21/0155 177/144 |
| 2005/0023810 A1 * | 2/2005 | Basir | B60R 21/01532 280/735 |
| 2005/0275554 A1 * | 12/2005 | Patterson | B60N 2/002 340/667 |
| 2010/0138113 A1 | 6/2010 | Lee et al. | |
| 2012/0018989 A1 | 1/2012 | Breed | |

OTHER PUBLICATIONS

Occupant Classification Systems, www.airbagsolutions.com/docs/ocs.pdf, 1 page, available on or before Nov. 28, 2010.

* cited by examiner

*Primary Examiner* — Van Trieu
(74) *Attorney, Agent, or Firm* — Frank A. MacKenzie; Bejin Bieneman PLC

(57) ABSTRACT

A vehicle system includes at least two sensors. A first sensor is configured to output a child restraint signal indicating a presence of a child restraint system. A second sensor is configured to output a belt tension signal representing a tension associated with a seat belt. A processing device is programmed to determine whether the child restraint system includes a child seat or a booster seat based on the child restraint signal and the belt tension signal.

20 Claims, 3 Drawing Sheets

VEHICLE OCCUPANT CLASSIFICATION

BACKGROUND

Vehicle occupant classification systems are becoming increasingly sophisticated. Using sensors, vehicle occupant classification systems are able to determine, with some specificity, information about the vehicle occupants. For example, the systems can determine which seats are occupied, whether the occupant is a child or adult, whether a child seat is present, whether the child seat is occupied, etc. This information is transmitted to the restraints system, which uses the information for various purposes, including controlling deployment of restraints components.

DETAILED DESCRIPTION

Occupant classification systems have been unable to separate different types of child restraint systems into specific categories required by various restraints components. For example, occupant classification systems have not been able to tell a child seat from a front-facing booster seat. This category may be required for a seat belt load limiter system which sets the load of the seat belts during an impact based on occupant characteristics. An example system that can make such a distinction includes at least two sensors and a processing device. A first sensor—such as a capacitive or force-based sensor—is configured to output a child restraint signal indicating the mere presence of a child restraint system. A second sensor—such as a belt tension sensor—is configured to output a belt tension signal representing a tension associated with a seat belt. The processing device is programmed to determine whether the child restraint system includes a child seat or a booster seat based on the child restraint signal and the belt tension signal.

For instance, child seats are often designed to receive a seat belt. The seat belt acts directly on the child seat, which includes its own harness for restraining the child. With a booster seat, however, the seat belt acts directly on the child and exerts less pressure than it would on a child seat. Therefore, once the first sensor has detected the presence of the child seat, the amount of tension on the seat belt can be used to determine whether the child restraint system is a child seat or a front-facing booster seat.

The elements shown may take many different forms and include multiple and/or alternate components and facilities. The example components illustrated are not intended to be limiting. Indeed, additional or alternative components and/or implementations may be used.

Figure 1:
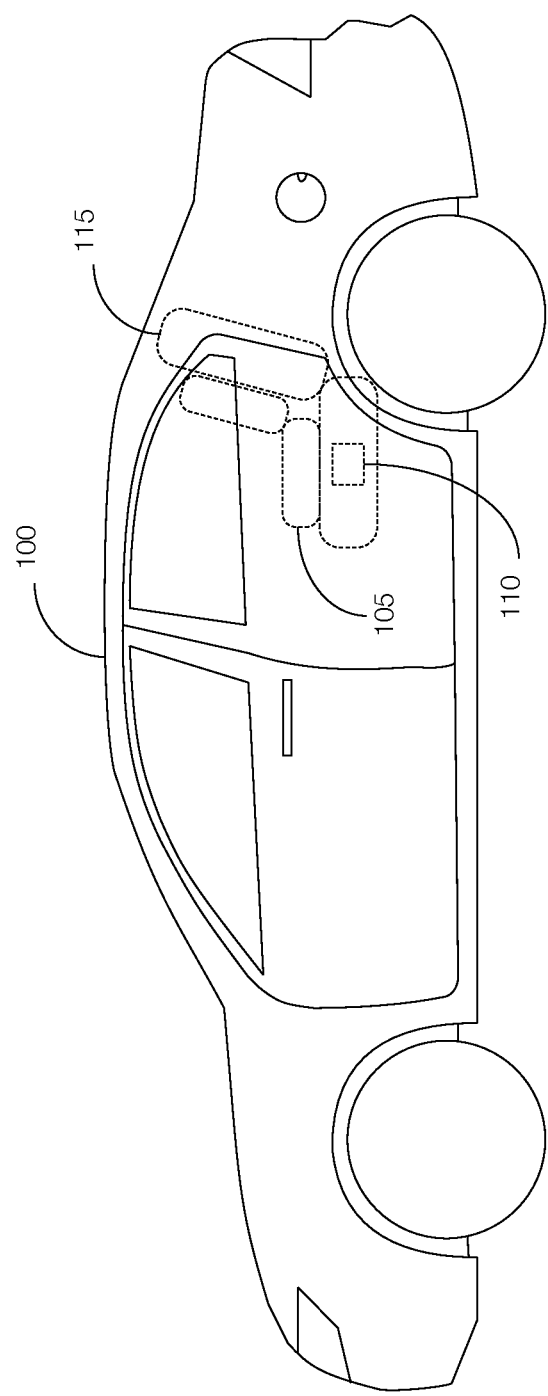
FIG. 1 illustrates an example vehicle with a restraint detection system.

As illustrated in FIG. 1, the vehicle 100 includes a child restraint system 105 and a restraint detection system 110. Although illustrated as a sedan, the vehicle 100 may include any passenger or commercial automobile such as a car, a truck, a sport utility vehicle, a crossover vehicle, a van, a minivan, a taxi, a bus, etc. In some possible approaches, the vehicle 100 is an autonomous vehicle configured to operate in an autonomous (e.g., driverless) mode, a partially autonomous mode, and/or a non-autonomous mode.

The child restraint system 105 may include a device, such as a child seat or a booster seat, located on a rear seat 115 and configured to restrain a child in the vehicle 100. The child seat may include harnesses for restraining the child. In some instances, the child seat may rest in a base disposed on the seat. The child seat may be front-facing or rear-facing and held to the rear seat 115 by a seat belt, anchors, or both. The booster seat may be front-facing and resting on the rear seat or held to the rear seat 115 by anchors. A child may be restrained in the child seat with harnesses. The seat belt may restrain a child sitting in a booster seat.

The restraint detection system 110 may be configured to determine whether a child restraint system 105 is present on one or more rear seats 115 and identify the type of device—either a child seat or booster seat—located on the rear seat 115. The restraint detection system 110 may be configured to detect the presence of the child restraint system 105 based on the amount and/or distribution of pressure exerted on the seat, capacitance of a seat occupant, or both. If the child restraint system 105 is present, the restraint detection system 110 may determine whether a child seat or booster seat is present. For example, the restraint detection system 110 may monitor the amount of tension on a seat belt. Little to no tension may indicate that the restraint detection system 110 includes a booster seat or another type of child restraint device where the seat belt acts directly on the child. A higher amount of tension may indicate that the restraint detection system 110 includes a child seat or another type of restraint device where the seat belt acts on the device itself, often because the restraint device includes its own harness for restraining the child. If the seatbelt system is not engaged/buckled and the seat presence is sensed, this may indicate a front/rear facing child seat held on the rear seats using seat anchors only. In other words, if a child restraint system 105 is detected, the restraint detection system 110 may be configured to determine the type of restraint device by noting the engagement state of the seat belt system and by comparing a tension on the seat belt to a threshold value.

Figure 2:
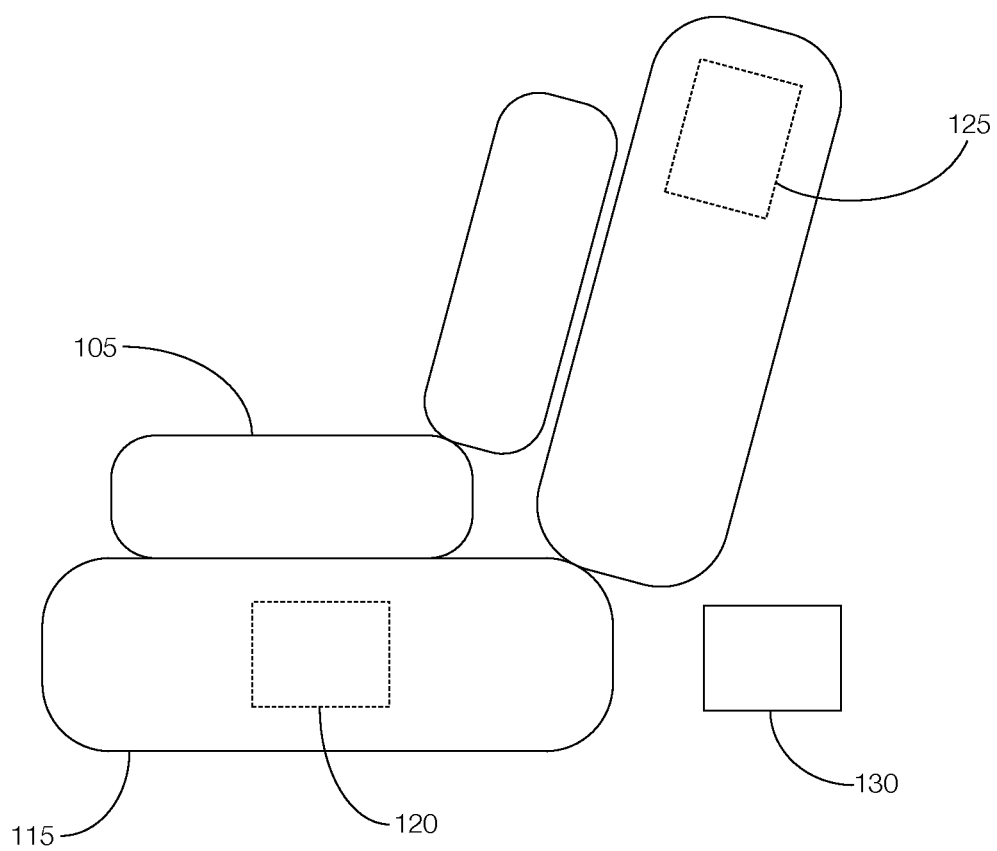
FIG. 2 is a block diagram of an example restraint detection system that may be incorporated into the vehicle of FIG. 1.

FIG. 2 is a block diagram of an example restraint detection system 110. As shown, the restraint detection system 110 includes a first sensor 120, a second sensor 125, and a processing device 130.

The first sensor 120 may be configured to detect the presence of the child restraint system 105. In some possible implementations, the first sensor 120 may include a capacitive sensor or another proximity-based sensor. The first sensor 120, therefore, may be configured to detect the presence of the child restraint by detecting whether the object on the seat exerts a capacitance similar to that of a human body. If such a capacitance is detected, the first sensor 120 may be configured to output a signal indicating that no child restraint system 105 is present. If no such capacitance is detected, the first sensor 120 may output a child restraint signal indicating that the object on the seat may include a child restraint system 105.

The second sensor 125 may be configured to generate and output a belt tension signal representing the tension applied by a seat belt associated with the rear seat 115. For example, the second sensor 125 may include a belt tension sensor. It may be located anywhere along the belt travel, including the belt anchor points, the buckle, or the retractor itself. The seat belt may exert more tension when acting on a child seat than when acting on a booster seat. The belt tension signal may represent the amount of tension applied. Alternatively, the belt tension signal may indicate that the tension applied by the seat belt exceeds a predetermined threshold. Therefore, the belt tension signal may only be generated and output if, e.g., the child restraint system 105 includes the child seat.

The processing device 130 may be programmed to receive the child restraint signal and belt tension signal and determine whether the child restraint system 105 includes the child seat or booster seat. For instance, the processing device 130 may compare the belt tension represented by the belt tension signal to a predetermined threshold. If the belt tension exceeds the predetermined threshold, the processing device 130 may be programmed to determine that the child restraint system 105 includes the child seat. If the belt tension is below the predetermined threshold, the processing device 130 may be programmed to determine that the child restraint system 105 includes the booster seat. The processing device 130 may be programmed to only consider the belt tension represented by the belt tension signal if the child restraint signal indicates the presence of a child restraint system 105 on the rear seat 115. That is, the processing device 130 may ignore the belt tension signal unless a child restraint system 105 is detected. Otherwise, the processing device 130 might inadvertently determine that a booster seat is present on the rear seat 115 instead of a human passenger.

Figure 3:
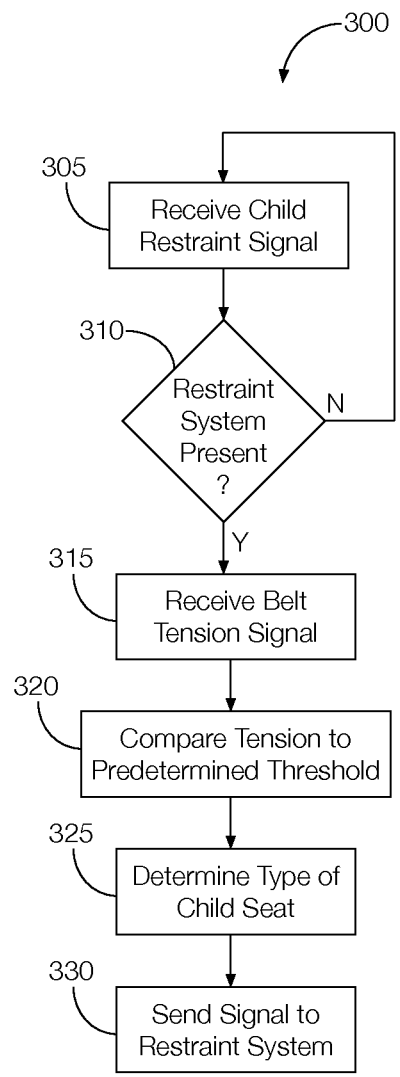
FIG. 3 is a flowchart of an example process that may be executed by the restraint detection system of FIG. 2.

FIG. 3 is a flowchart of an example process 300 that may be executed by the restraint detection system 110. The process 300 may begin when the vehicle 100 is turned on and may continue to execute until the vehicle 100 is turned off and all passengers exit the vehicle 100.

At block 305, the processing device 130 may receive the child restraint signal. The child restraint signal may be generated and output to the processing device 130 by the first sensor 120. The child restraint signal may represent a profile of an object on one of the rear seats 115. The profile may be used to determine whether the object is a human, a child restraint system 105, or something else.

At decision block 310, the processing device 130 may determine whether a child restraint system 105 is present on the rear seat 115. For instance, the processing device 130 may determine whether the child restraint system 105 is present based on the child restraint signal received at block 305. If the child restraint system 105 is present, the process 300 may continue at block 315. If the child restraint system 105 is not present, e.g., the child restraint signal was not received, the process 300 may return to block 305 until the child restraint signal is received. By returning to block 305, the processing device 130 may ignore the output of the second sensor 125 unless the child restraint system 105 is present.

At block 315, the processing device 130 may receive the belt tension signal. The belt tension signal may be generated and output to the processing device 130 by the second sensor 125. The belt tension signal may represent an amount of tension applied by the seat belt associated with the rear seat 115.

At block 320, the processing device 130 may compare the tension represented by the belt tension signal to a predetermined threshold. The predetermined threshold may be used to distinguish the type of tension applied to a child seat from the amount of tension applied to a booster seat. The seat belt acts directly on the child seat since the child seat includes its own harness system. With a booster seat, however, the seat belt acts directly on the passenger. Therefore, the seat belt will exert less tension when used with a booster seat.

At block 325, the processing device 130 may determine whether the child restraint system 105 includes a child seat or a booster seat. For example, if the tension on the seat belt exceeds the predetermined threshold, the processing device 130 may determine that the child restraint system 105 includes a child seat, which could be rear-facing or front-facing. If the tension is below the predetermined threshold, the processing device 130 may determine that the child restraint system 105 includes the booster seat, which may be front-facing.

At block 330, the processing device 130 may output a signal indicating whether the child restraint system 105 includes a booster or child seat. Other vehicle 100 systems, such as a restraint system, may be configured to account for the type of child restraint system 105 included in the vehicle 100. The process 300 may continue to block 305 and may continue to execute until the vehicle 100 is turned off.

In general, the computing systems and/or devices described may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
a first sensor configured to output a child restraint signal indicating a presence of a child restraint system;
a second sensor configured to output a belt tension signal representing a tension associated with a seat belt; and
a processing device programmed to distinguish between a child seat and a booster seat based on the child restraint signal and the belt tension signal.

2. The vehicle system of claim 1, wherein the first sensor includes a capacitive sensor configured to detect the child restraint system.

3. The vehicle system of claim 1, wherein the first sensor includes a force-based sensor configured to detect the child restraint system.

4. The vehicle system of claim 1, wherein the second sensor includes a belt tension sensor configured to detect the tension applied by the seat belt.

5. The vehicle system of claim 4, wherein the processing device is programmed to determine that the child restraint system includes the booster seat if the belt tension is below a predetermined threshold.

6. The vehicle system of claim 4, wherein the processing device is programmed to determine that the child restraint system includes the child seat if the belt tension exceeds a predetermined threshold.

7. The vehicle system of claim 1, wherein the processing device is programmed to ignore the belt tension signal if the child restraint signal indicates that no child restraint system is present.

8. A vehicle system comprising:
a seat;
a child restraint system disposed on the seat;
a restraint system having a seat belt configured to hold the child restraint system to the seat;
a first sensor configured to output a child restraint signal indicating a presence of the child restraint system on the seat;
a second sensor configured to output a belt tension signal representing a tension associated with the seat belt; and
a processing device programmed to distinguish between a child seat and a booster seat based on the child restraint signal and the belt tension signal.

9. The vehicle system of claim 8, wherein the first sensor includes a capacitive sensor configured to detect the child restraint system.

10. The vehicle system of claim 8, wherein the first sensor includes a force-based sensor configured to detect the child restraint system.

11. The vehicle system of claim 8, wherein the second sensor includes a belt tension sensor configured to detect the tension applied by the seat belt.

12. The vehicle system of claim 11, wherein the processing device is programmed to determine that the child restraint system includes the booster seat if the child restraint signal indicates the presence of the child restraint system and the tension is below a predetermined threshold.

13. The vehicle system of claim 11, wherein the processing device is programmed to determine that the child restraint system includes the child seat if the child restraint signal indicates the presence of the child restraint system and the tension exceeds a predetermined threshold.

14. The vehicle system of claim 8, wherein the processing device is programmed to ignore the belt tension signal if the child restraint signal indicates that no child restraint system is present.

15. A method comprising:
    receiving a child restraint signal indicating a presence of a child restraint system on a vehicle seat;
    receiving a belt tension signal representing a tension associated with a seat belt;
    determining whether the child restraint system includes a child seat or a booster seat based on the child restraint signal and the belt tension signal; and
    generating a seat type signal distinguishing between a child seat and a booster seat in accordance with the child restraint signal and the belt tension signal.

16. The method of claim 15, wherein the child restraint system is determined to include the booster seat if the tension represented by the belt tension signal is below a predetermined threshold.

17. The method of claim 15, wherein the child restraint system is determined to include the child seat if the tension represented by the belt tension signal exceeds a predetermined threshold.

18. The method of claim 15, further comprising determining whether the child restraint signal indicates the presence of the child restraint system.

19. The method of claim 18, wherein the child restraint system is determined to include the booster seat if the restraint signal indicates the presence of the child restraint system and the tension represented by the belt tension signal is below a predetermined threshold, and
    wherein the child restraint system is determined to include the booster seat if the restraint signal indicates the presence of the child restraint system and the tension represented by the belt tension signal exceeds the predetermined threshold.

20. The method of claim 18, further comprising ignoring the belt tension signal if the child restraint signal indicates that no child restraint system is present.

\* \* \* \* \*